Figure 1:
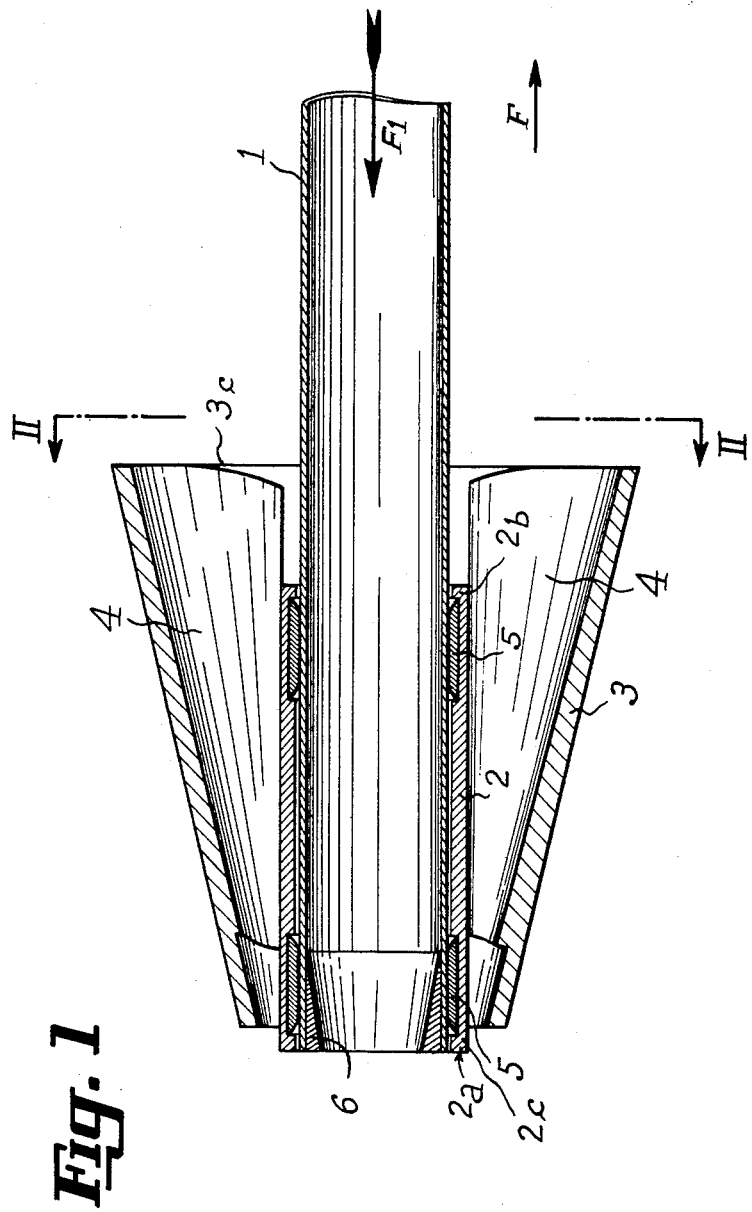

Jan. 16, 1962 A. IAPELLA ET AL 3,016,692
COMBUSTION ENGINE EXHAUST TREATMENT
Filed June 27, 1960 3 Sheets-Sheet 1

Jan. 16, 1962 A. IAPELLA ET AL 3,016,692
COMBUSTION ENGINE EXHAUST TREATMENT
Filed June 27, 1960 3 Sheets-Sheet 2

United States Patent Office 3,016,692
Patented Jan. 16, 1962

3,016,692
COMBUSTION ENGINE EXHAUST TREATMENT
Arnaldo Iapella, 38 Rue Fernand Forest, André Lécolle, 5 Rue Kellog, and René Ducimetiere, 49 Rue de la Republique, all of Suresnes, France
Filed June 27, 1960, Ser. No. 38,957
Claims priority, application France June 27, 1959
5 Claims. (Cl. 60—30)

This invention relates to exhaust arrangements for internal combustion engines and the like, and its general objects lie in the provision of an improved exhaust arrangement whereby the velocity of the exhaust gases will be substantially increased thereby enhancing the efficiency ratio of the engine to permit in turn the attainment of higher engine speeds and/or reduced fuel consumption as compared to the performance of the same combustion engine equipped with a conventional exhaust arrangement.

It has already been proposed to provide static means associated with the exhaust outlet of a combustion engine and operative to create a suction at said outlet in order to accelerate the velocity of the exhaust gases. The said means may comprise a generally frustoconical nozzle surrounding the end portion of the exhaust pipe, with the small end of the nozzle spaced coaxially around the outlet end of said exhaust pipe. In the operation of such an arrangement, air enters the annular space defined between the outer periphery of the exhaust pipe and the surrounding frustoconical nozzle; such air intake may result from the relative motion relative to the surrounding air in the case of a vehicle combustion engine or it may be induced by a fan or the like in the case of a stationary installation. The airstream is progressively accelerated owing to the tapered shape of its flowpath and creates round the outlet of the exhaust pipe a negative pressure which in turn accelerates the exhaust gases issuing out of said pipe. However, conventional arrangements of this kind have proved to be of only moderate to poor efficiency in practice, especially owing to the instability of the suction zone created round the outlet of the exhaust pipe. A specific object of this invention therefore is to provide an exhaust arrangement of the general type just specified, but including improved structural features whereby the stability of the suction zone will be considerably improved and which will remain effective even at relatively low airstream velocities to accelerate the exhaust gases to a considerable extent.

According to a feature of the invention, the stability of the suctional zone is improved by the provision of means imparting a gyratory motion to the airstream through the tapered nozzle surrounding the exhaust pipe. In accordance with an embodiment of the invention the gyratory motion-imparting means may comprise generally helical vanes extending in the space between the outer periphery of the exhaust pipe and the inner periphery of the frustoconical tapered nozzle.

In conventional exhaust-accelerating arrangements of the kind referred to above, there were provided angularly spaced walls or vanes interconnecting the exhaust pipe and the tapered surrounding nozzle, but such walls were generally flat since they were provided for the sole purpose of supporting the nozzle around the exhaust pipe nor were they intended or adapted to serve any other function. Hence they did not and could not impart gyratory or vortical motion to the airstream and the advantageous results of the invention were not attained.

According to a further feature of the invention, the outlet of the exhaust pipe is preferably made to project somewhat beyond the small end or throat of the tapered nozzle, in contradistinction to the conventional arrangement where said outlet end was usually positioned inwardly spaced from the throat of the nozzle. Tests have shown that this latter provision of the invention further contributes to the establishment of a highly stable suction zone for drawing out the exhaust gases.

Conveniently, the exhaust arrangement of the invention may comprise a cylindrical tubular member adapted to be fitted around a rear section of the exhaust pipe in sealing engagement therewith, a tapered nozzle coaxially surrounding said member with its small end spaced radially outwardly and axially inwardly of the adjacent end part of said tubular member, and a series of angularly spaced, generally helicoidal, vanes interconnecting said tubular member and tapered nozzle member. According to a further preferred feature, the tapered nozzle member is provided with a diverging portion extending beyond its small end, and serving broadly to protect the suction zone created thereat against external disturbing causes.

A particularly desirable feature of the invention arises out of the fact that the gyratory motion of the airstream to establish a stable suction zone around the exhaust outlet can be obtained by purely static means, namely the helicoidal vanes, without moving parts.

Figure 2:
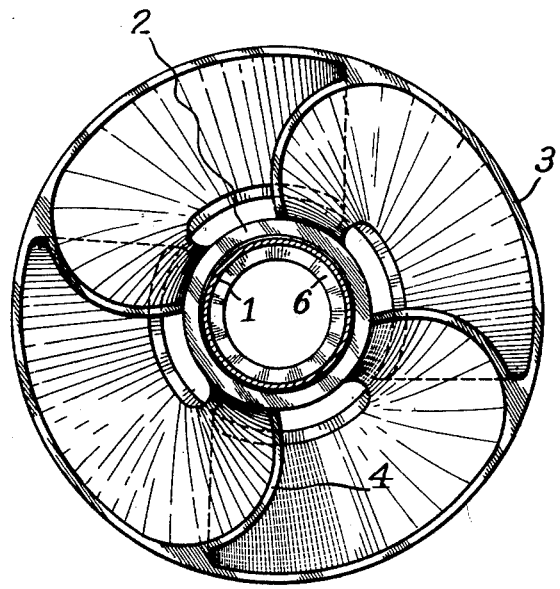
Figure 3:
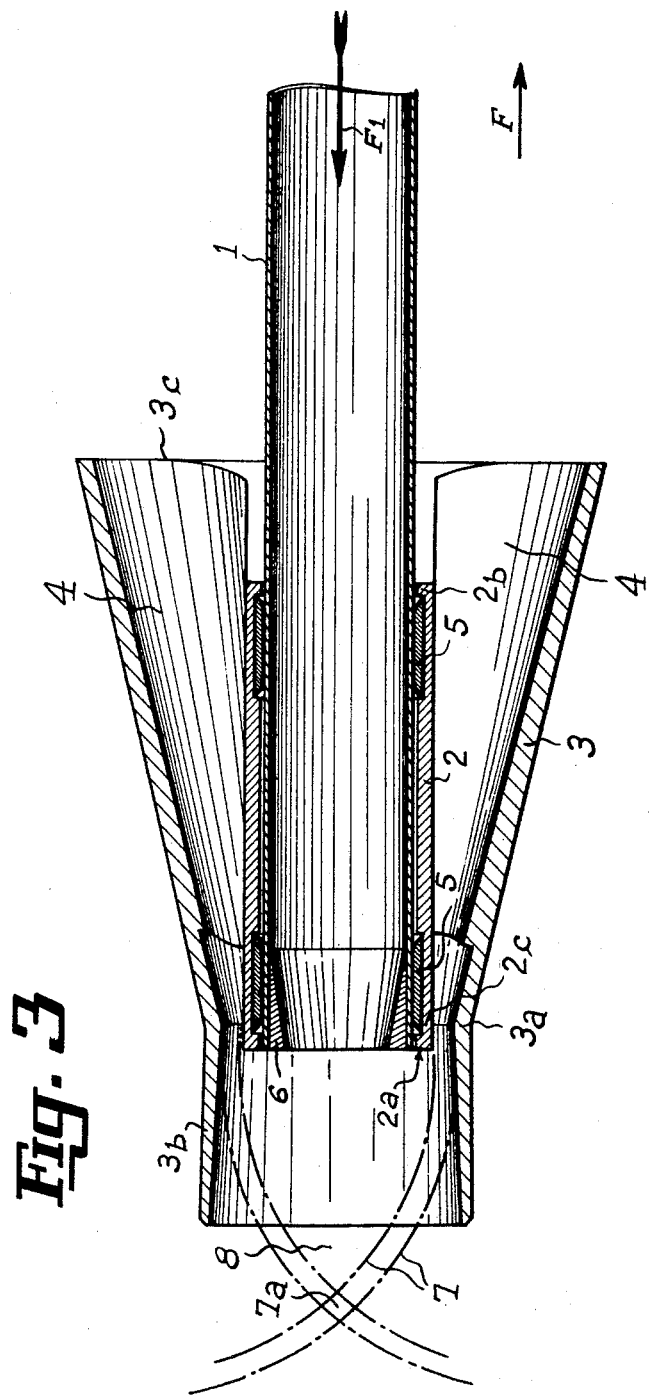

An exemplary embodiment of the invention, as well as a modification thereof, will now be described by way of illustration but not of limitation with reference to the accompanying drawings, wherein:

FIG. 1 is an axial section view of an improved exhaust,
FIG. 2 is an end view on the like II—II of FIG. 1,
FIG. 3 is similar to FIG. 1 but shows a modification, Referring to the drawings, there is shown an outer end portion of an exhaust pipe 1, around which is fitted a tubular sleeve member 2 connected with a surrounding frustoconical nozzle member 3 by means of the angularly spaced, helicoidal vanes 4 whereby the nozzle 3 is held in coaxial relation with the cylindrical sleeve member 2.

The invention will be described more specifically referring to the case of a vehicle moving in the direction indicated by arrow F and the exhaust gases from the vehicle power plant flowing through the exhaust pipe 1 as indicated by arrow $F_1$. It will be understood that the invention would be applicable to a variety of stationary and movable installations and the requisite modifications for adapting it to such particular purposes, as by providing a fan to create the relative airstream in the case of a stationary system will be evident to those familiar with the art.

The nozzle 3 converges in the rearward direction and the rear end 2a of sleeve member 2 is positioned somewhat beyond the small end of the nozzle.

Referring especially to FIG. 2, it is seen that there are provided four helicoidal vanes 4 disposed between the inner surface of nozzle 3 and outer surface of sleeve member 2 and equispaced therearound. The vanes extend substantially throughout the length of the nozzle. Near each end of sleeve member 2 there are formed recesses 2b and 2c and seal rings 5 made of yielding material are inserted therein between said member and the pipe 1. While the arrangement thus described provides a simple and effective means of securing the improved unit comprising sleeve 2, nozzle 3 and vanes 4 over the exhaust pipe 1 in an existing installation without modification of the latter, it should however be understood that if desired the vanes may be directly secured to the exhaust pipe 1, without exceeding the scope of the invention.

Preferably, a bushing 6 having a rearwardly converging bore is inserted in the outlet of the exhaust pipe 1 at the end thereof. This bushing serves both to secure the sleeve 2 around the pipe 1 and to impart to the exhaust gases a desirably converging flowpath.

In the modified form of the invention shown in FIG. 3 the nozzle member 3 is further extended in the rearward direction beyond its smallest-diameter part or throat 3a by a somewhat diverging portion 3b. It is however to be noted that in this embodiment also, the outlet end 2a of the sleeve member or the outlet end of the exhaust pipe 1 itself, is still positioned axially outwardly of the small end of the converging nozzle member 3 proper, i.e. beyond the throat section 3a thereof.

In operation as the vehicle travels rightward (arrow F) exhaust gases from the vehicle engine are flowing leftward (arrow $F_1$) through exhaust pipe 1. Due to the motion air enters the large diameter annular inlet between tapered nozzle 3 and the surface of pipe 1 at a velocity equal to the velocity of vehicle travel, and the helicoidal vanes 4 impart to the airstream a gyratory motion while at the same time subjecting the air to some degree of compression. At the throat 3a of the nozzle, the airstream reaches a maximum flow velocity and thereafter forms a fluid dome as schematically indicated by the chain lines 7. Owing to the resulting vortical effect well-known in fluid mechanics, there is formed within the walls of this dome a relatively stable area 8 in which the pressure is substantially lower than that of the surrounding air. This negative pressure exerts upon the outflowing exhaust gases a suction effect which substantially increases their velocity.

While the above mechanism of operation is generally true for both the embodiments of FIGS. 1 and 3, the diverging extension or hood 3b of the FIG. 3 embodiment assists in stabilizing the air dome in that it prevents a dispersion of the peripheral air filaments at the walls 7 of said dome and in maintaining the apex 7a of said dome at an increased distance from the outlet of the exhaust. Thus at low velocities external disturbances remain substantially without effect on the airstream issuing out of the annular space between throat 3a and the outlet end 2a of the sleeve member. At higher velocities the apex 7a is held at an increased distance from the exhaust outlet than in the absence of the hood 3b, thereby increasing the efficiency of the suction effect.

Tests with vehicles equipped with the arrangement of the invention have evidenced a very substantial increase in engine efficiency permitting augmented engine speed for a given fuel consumption rate or diminished consumption for a given engine speed.

It will be understood that various modifications may be made in the structure shown and described without exceeding the scope of the invention, e.g. for adapting the arrangement to various types of engine exhaust systems.

What we claim is:
1. An arrangement for increasing exhaust gas velocity at the outlet of a combustion engine exhaust pipe, comprising a tapered nozzle member coaxially surrounding said pipe and defining therewith an annular space tapered in a direction towards the pipe outlet, and angularly spaced helicoidal vanes in said annular space for imparting a gyratory motion to an airstream flowing therethrough, the outlet end of said pipe being located rearwardly of said nozzle.

2. An arrangement for increasing exhaust gas velocity at the outlet of a combustion engine exhaust pipe comprising a tapered nozzle coaxially surrounding said pipe and defining therewith an annular space tapered in a direction towards the pipe outlet, and angularly spaced helicoidal vanes in said annular space for imparting a gyratory motion to an airstream flowing therethrough, the outlet of said pipe being located rearwardly of said nozzle and the vanes terminating inwardly of said nozzle.

3. An arrangement according to claim 1, wherein said nozzle comprises a coaxial extension wall beyond the small end thereof which extension wall projects beyond the outlet end of said exhaust pipe and has a rearwardly diverging inner surface.

4. An arrangement according to claim 1, which comprises a tubular member substantially coaxial and coextensive with said nozzle, and means for sealingly fitting said member around the exhaust pipe, and said helicoidal vanes have their radially inner ends attached to the outer surface of said member and their radially outer ends attached to the inner surface of said nozzle.

5. An arrangement according to claim 3, which includes a bushing having an outer surface adapted to be tightly fitted in the outer end of said exhaust pipe and having an inner surface converging in the direction towards the outlet of said exhaust pipe.

References Cited in the file of this patent
UNITED STATES PATENTS

| | | |
|---|---|---|
| 1,522,032 | Scarff | Jan. 6, 1925 |
| 2,667,031 | Ryder | Jan. 26, 1954 |

FOREIGN PATENTS

| | | |
|---|---|---|
| 125,775 | Great Britain | Apr. 28, 1919 |
| 386,901 | Great Britain | Jan. 26, 1933 |
| 717,880 | Great Britain | Nov. 3, 1954 |